United States Patent Office
3,029,210
Patented Apr. 10, 1962

3,029,210
COMPOSITION COMPRISING A VINYLIDENE POLYMER AND A COMPOUND CONTAINING BORON, OXYGEN AND SILICON IN A RING STRUCTURE
Stephen J. Groszos, Naperville, Ill., assignor to American Cyanamid Company, New York, N.Y., a corporation of Maine
No Drawing. Original application Sept. 16, 1957, Ser. No. 683,972, now Patent No. 2,957,900, dated Oct. 25, 1960. Divided and this application Mar. 30, 1960, Ser. No. 18,469
6 Claims. (Cl. 260—29.1)

This invention relates to plasticized compositions and, more particularly, to compositions comprising (1) a polymer selected from the class consisting of polyvinyl halides and polyvinylidene halides and (2) a compound containing boron, oxygen and silicon in a ring structure.

The compounds used in practicing this invention may be represented graphically by the following general formula:

I

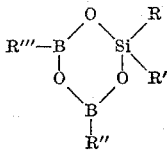

wherein R, R', R'' and R''' each represents a carbocyclic radical, and which are the same or different. An illustrative example of a compound embraced by Formula I is 2,2,4,6-tetraphenyl-1,3,5-trioxa-2-siladiborinane, the formula for which is

II

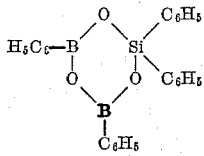

Illustrative examples of carbocyclic radicals represented by R, R', R'' and R''' in Formula I are phenyl, mono- and polyalkylphenyls (e.g., tolyl, xylyl, mono-, di- and triethyl, -propyl, -isopropyl, -butyl, -allyl, etc., phenyls), biphenylyl or xenyl, naphthyl, mono- and polyalkylnaphthyls (e.g., methylnaphthyl, diethylnaphthyl, tripropylnaphthyl, etc.), tetrahydronaphthyl, anthryl, mono- and polyalkylanthryls (e.g., mono-, di-, tri- and tetramethyl, -ethyl, -propyl, -butyl, etc., anthryls), the various cycloalkyls (e.g., cyclopentyl, cyclohexyl, cycloheptyl, etc.), the various cycloalkenyls (e.g., cyclopentenyl, cyclohexenyl, cycloheptenyl, etc.), and halogenated (chlorinated, brominated, fluorinated and iodinated) carbocyclic radicals corresponding to those mentioned above, e.g., mono-, di-, tri- and tetrachloro-, bromo-, fluoro- and iodophenyl, etc. Other examples include the alkoxy (e.g., methoxy, ethoxy, propoxy, butoxy, etc.) carbocyclic radicals corresponding to the carbocyclic hydrocarbon radicals given above by way of example. Still other examples of carbocyclic radicals will be apparent to those skilled in the art from the foregoing illustrative examples.

The symmetrical compounds used in practicing this invention can be prepared, for example, by reacting together (1) a carbocyclylboronic acid, RB(OH)₂ where R represents a carbocyclic radical (e.g., phenylboronic acid, tolylboronic acid, etc.), with (2) a di-(carbocyclyl)-silanediol,

III

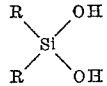

wherein each R represents a carbocyclic radical (e.g., diphenylsilanediol, ditolylsilanediol, etc.), under acidic conditions, and while the said reactants are contained in an inert, organic, liquid medium, e.g., benzene, toluene, xylene, etc. The reactants are preferably employed in the ratio of at least 2 moles (e.g., 2 to 3 moles) of the carbocyclylboronic acid of (1) per mole of the di-(carbocyclyl)silanediol of (2). The reaction can be effected using, for instance, less than 2 moles of carbocyclylboronic acid per mole of the di-(carbocyclyl)silanediol, e.g., approximately equal molar proportions of reactants, in which case one-half of the silanediol remains as unreacted material in the reaction mass. The reaction is continued, advantageously at the boiling temperature of the reaction mass, until no more water of condensation is evolved. The resulting siladiborinane is then isolated from the reaction mass by any suitable method.

Unsymmetrical compounds employed in practicing this invention can be prepared, for example, by using a mixture of different starting reactants. Thus, one can react 2 moles of phenylboronic acid with 1 mole of di-(p-tolyl)-silanediol or with 1 mole of (cyclohexyl)phenylsilanediol to produce, respectively, 2,2-p-tolyl-4,6-diphenyl-1,3,5-trioxa-2-siladiborinane and 2-cyclohexyl-2,4,6-triphenyl-1,3,5-trioxa-2-siladiborinane.

In order that those skilled in the art may better understand how the present invention can be carried into effect, the following examples are given by way of illustration and not by way of limitation. All parts and percentages are by weight unless otherwise indicated.

EXAMPLE 1

This example illustrates the preparation of 2,2,4,6-tetraphenyl-1,3,5-trioxa-2-siladiborinane, that is, the compound of Formula II, by reaction between phenylboronic acid and diphenylsilanediol.

(A) Preparation of Diphenylsilanediol

Diphenylsilanediol is prepared by the hydrolysis of diphenyldichlorosilane. In this hydrolysis 80 g. (0.317 mole) diphenyldichlorosilane is dissolved in 30.8 ml. toluene. This solution is added over a period of 25 minutes to a rapidly stirred mixture of 30.8 ml. toluene, 64.4 ml. isopropyl alcohol and 266.4 ml. water. The product forms as a white precipitate. The reaction mixture is stirred for 10 minutes after the addition has been completed; thereafter the solid is collected on a Büchner funnel, washed with water until free of acid and air-dried. The yield of colorless, granular solid is 61 g. or 88% of the theoretical yield. This product can be purified, if desired, by recrystallization from warm methyl ethyl ketone and chloroform.

(B) Preparation of 2,2,4,6-Tetraphenyl-1,3,5-Trioxa-2-Siladiborinane

A 3-necked flask is equipped with stirrer, thermometer and a Dean and Stark moisture trap to measure the water of reaction which is azeotroped out with toluene. This flask is charged with 24.38 g. (0.2 mole) phenylboronic acid, 21.6 g. (0.1 mole) diphenylsilanediol, 125 ml. toluene, and 0.432 g. p-toluene sulfonic acid monohydrate. The toluene-water azeotrope begins to distill after the solution has been heated to 91° C. A total of 3.8 ml. water is collected in 14 minutes as the pot temperature rises to about 120° C. Heating is continued until no more water of condensation is evolved. The slightly yellow solution is chilled and the solid which forms is filtered off. An additional amount of product is obtained by chilling the filtrate. Infrared analysis of this product indicates the structure shown in Formula II. The product, M.P. 156°–160° C., can be purified, if desired, by recrystallization from toluene.

EXAMPLE 2

2,2,4,6 - tetra - (p - tolyl) - 1,3,5 - trioxa - 2 - siladiborinane is prepared in essentially the same manner described under Example 1–B with the exception that, instead of the primary reactants used in that example, there are used 0.2 mole p-tolylboronic acid and 0.1 mole di-(p-tolyl)-silanediol.

EXAMPLE 3

Essentially the same procedure described under Example 1–B is used in the preparation of 2,2,4,6-tetra-(m-chlorophenyl)-1,3,5-trioxa-2-siladiborinane with the exception that, instead of the primary reactants employed in that example, there are used 0.2 mole m-chlorophenylboronic acid and 0.1 mole di-(m-chlorophenyl)silanediol.

EXAMPLE 4

This example illustrates the preparation of an unsymmetrical siladiborinane, more particularly 2-phenyl-2,4,6-tricyclohexyl-1,3,5-trioxa-2-siladiborinane from cyclohexylboronic acid and (cyclohexyl)phenylsilanediol.

(A) Preparation of Cyclohexylboronic Acid

Cyclohexyl magnesium bromide is prepared from 0.1 mole cyclohexylbromide and 0.1 gram atom magnesium turnings in ether solution in the usual manner. This solution is added dropwise over a period of 6 to 8 hours to a solution of 0.11 mole tri-n-butyl borate in 100 ml. dry ether maintained at a temperature of about −75° C. (Dry Ice-acetone bath). The reaction mixture is allowed to warm to about −10° C. when 60 ml. of 10%, by volume, aqueous $H_2SO_4$ is added over a period of 15 to 20 minutes. The ether solution is separated, washed with water and extracted with three portions of 5% aqueous NaOH solution. The aqueous extract is acidified with 10% aqueous $H_2SO_4$, and the mixture is extracted with three 40 ml. portions of ether. The combined ether extracts are then evaporated (without the necessity of drying) on a water bath to yield cyclohexylboronic acid which can be used as described below without further purification.

(B) Preparation of 2-Phenyl-2,4,6-Tricyclohexyl-1,3,5-Trioxa-2-Siladiborinane Essentially the same procedure is followed as described under Example 1–B with the exception that, instead of the primary reactants and molar amounts used in that example, there are used the solution of A containing 0.1 mole of cyclohexylboronic acid and 0.05 mole of (cyclohexyl)phenylsilanediol (a known compound).

The following example illustrates the production of a plasticized composition of the present invention.

EXAMPLE 5

| | Parts |
|---|---|
| Polyvinyl chloride (gamma polyvinyl chloride) | 100 |
| 2,2,4,6-tetraphenyl-1,3,5-trioxa-2-siladiborinane | 50 | are mixed together on a standard rubber mill at about 150° C. until a sheet, 50 to 60 mils thick, is obtained. The resulting sheet is ground and screened to make a molding (moldable) composition. It is suitable for uses where polyvinyl chloride molding compositions are now employed.

One can replace part of the siladiborinane used in the above formulation, for instance up to 90% by weight thereof (45 parts), with other plasticizers for polyvinyl chloride, e.g., a saturated aliphatic hydrocarbon triester of cyanuric acid, especially a trialkyl cyanurate and more particularly one containing not less than 4 and not more than 6 carbon atoms in each alkyl radical. The cyanuric triester not only functions as a plasticizer for polyvinyl chloride but also renders the plasticized composition resistant to discoloration under the action of heat.

The above-described siladiborinanes can be used in plasticized polyvinyl halide (chloride, bromide, etc.) and polyvinylidene halide (chloride, bromide, etc.) compositions, alone or with other plasticizers or modifiers, in amounts corresponding to from 2% to 65% by weight of the plasticized composition.

This application is a division of my copending application Serial No. 683,972, filed September 16, 1957, now Patent No. 2,957,900, dated October 25, 1960.

I claim:

1. A composition comprising (1) a polymer selected from the class consisting of polyvinyl halides and polyvinylidene halides and (2) a compound represented by the general formula

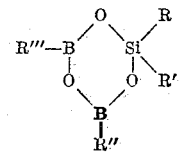

where R, R' R" and R'" each represents a carbocyclic radical, the compound of (2) constituting from 2% to 65% by weight of the aforesaid composition.

2. A composition as in claim 1 wherein R, R', R" and R'" each represents an aryl radical.

3. A composition as in claim 1 wherein R, R', R" and R'" each represents the same aryl radical.

4. A composition as in claim 1 wherein R, R', R" and R'" each represents a phenyl radical.

5. A composition as in claim 1 wherein the compound of (1) is polyvinyl chloride.

6. A plasticized composition comprising (1) polyvinyl chloride and (2) a plasticizer for said polyvinyl chloride comprising 2,2,4,6-tetraphenyl-1,3,5-trioxa-2-siladiborinane, the plasticizer of (2) constituting from 2% to 65% by weight of the plasticized composition.

References Cited in the file of this patent

UNITED STATES PATENTS 2,957,900    Groszos    Oct. 25, 1960